United States Patent
Lewis (10) Patent No.: US 6,393,261 B1
(45) Date of Patent: *May 21, 2002

(54) MULTI-COMMUNICATION ACCESS POINT (75) Inventor: Daniel E. Lewis, The Woodlands, TX (US)

(73) Assignee: Telxon Corporation, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/795,527

(22) Filed: Feb. 27, 2001

Related U.S. Application Data (63) Continuation of application No. 09/073,045, filed on May 5, 1998.

(51) Int. Cl.$^7$ .............................. H04Q 7/20; H04Q 7/24
(52) U.S. Cl. .................... 455/103; 455/435; 370/338
(58) Field of Search ................... 455/103, 435, 455/561, 432, 574, 101, 343; 370/338, 315, 328, 493, 401, 329, 344, 480; 375/132, 134, 137, 267, 135

(56) References Cited

U.S. PATENT DOCUMENTS

| | | |
|---|---|---|
| 5,276,680 A | 1/1994 | Messenger |
| 5,509,027 A | 4/1996 | Vook et al. |
| 5,546,397 A | 8/1996 | Mahany |
| 5,570,352 A | 10/1996 | Poyhonen |
| 5,636,220 A | 6/1997 | Vook et al. |
| 5,740,366 A | 4/1998 | Mahany et al. |
| 5,923,702 A | 7/1999 | Brenner et al. |
| 5,960,344 A | 9/1999 | Mahany |
| 6,002,918 A | 12/1999 | Heiman et al. |
| 6,047,175 A | 4/2000 | Trompower |
| 6,091,951 A | 7/2000 | Sturniolo et al. |
| 6,188,681 B1 * | 2/2001 | Vesuna ..................... 370/338 |
| 6,215,982 B1 * | 4/2001 | Trompower ................. 455/63 |
| 6,259,898 B1 * | 7/2001 | Lewis ........................ 455/103 |
| 6,295,461 B1 * | 9/2001 | Palmer et al. .............. 455/557 |

* cited by examiner

Primary Examiner—Edward F. Urban
Assistant Examiner—Erika A. Gary
(74) Attorney, Agent, or Firm—Renner, Otto, Boisselle & Sklar, LLP (57) ABSTRACT

An access point is provided for use in a wireless network having a system backbone and a plurality of mobile terminals. The access point includes a communication circuit coupling the access point to the system backbone, and a first transceiver for wirelessly communicating with at least one of the plurality of mobile terminals on a first communication channel. In addition, the access point includes a second transceiver for wirelessly communicating with at least another of the plurality of mobile terminals on a second communication channel different from the first communication channel.

44 Claims, 8 Drawing Sheets

| MOBILE TERMINAL ID (NETWORK ADDRESS) | TYPE | TRANSCEIVER |
|---|---|---|
| MT 21a | DATA | 36a |
|  | VOICE | 36b |
| MT 21a | DATA | 36a |
|  | VOICE | 36b |
|  | DATA |  |
|  | VOICE |  |

Fig. 8B

MULTI-COMMUNICATION ACCESS POINT

This application is a continuation of U.S. application Ser. No. 09/073,045 filed May 5, 1998.

TECHNICAL FIELD

The present invention relates generally to wireless networks, and more particularly to access points for use in wireless networks.

BACKGROUND OF THE INVENTION

In recent years, wireless networks have become increasingly popular. For example, networks including wireless mobile terminals now serve to help automate and expedite processes in retail, manufacturing, warehousing and other industries. In a retail environment, wireless mobile terminals may take the form of a wireless bar code reading device for use in tracking inventory and checking prices. In the warehousing industry, the same mobile terminals may be used to keep accurate accounting of incoming and outgoing shipments. In health care, transportation and other industries, the mobile terminals may take the form of wireless pen based computers to aid with on-site document control procedures, etc.

In order to provide for real time communication, the mobile terminals often include a radio which allows them to communicate with a host computer connected to a LAN, for example. LANs typically allow for connecting of devices operating in a building or specified site. Devices physically connected to the LAN may include desk top computers, printers and host computers. If the LAN also supports wireless mobile terminals such as those mentioned above, the LAN will also have connected thereto one or more access points (sometimes referred to as base stations). Each access point is coupled to the LAN and includes at least one radio through which wireless communication with the mobile terminals can occur.

Each access point can communicate with mobile terminals operating within the cell coverage area of the access point. The cell coverage area is the area in which the access point can reliably communicate with a mobile terminal. Once the mobile terminal roams outside of the cell coverage area of the access point, the mobile terminal can no longer communicate with the LAN through that particular access point. In order to provide cell coverage throughout an entire building or site, a LAN typically includes multiple access points strategically located throughout the building or site. Thus, the combined cell coverage of the access points is sufficient to cover the entire building or site. Mobile terminals may then roam from one area to another within the LAN.

Access points are known which include two radios for improving the reliability of a given wireless LAN. For example, U.S. Pat. No. 5,546,397 to Mahany describes an access point which includes two radios. In a first mode of operation, both radios operate on the same channel to create dual radio diversity. According to a second operating mode, the additional radio serves to monitor transmissions from other access points to confirm proper operation. In a third operating mode, the additional radio in two or more access points form a wireless bridge therebetween in the event of break in the network hardwired infrastructure.

Nevertheless, these conventional access points failed to address many non-reliability related problems. For example, such access points did not provide for simultaneous communications with two or more mobile terminals on respective channels.

Accordingly, there is a strong need with the art for an access point which provides for simultaneous communications with two or more mobile terminals on different channels. Moreover, there is a strong need in the art for an access point which carries out simultaneously different communication functions among the mobile terminals using respective radios. Finally, there is a strong need in the art for an access point which provides flexibility in operation based on the use of two or more radios.

SUMMARY OF THE INVENTION

In accordance with particular aspect of the invention, an access point is provided for use in a wireless network having a system backbone and a plurality of mobile terminals. The access point includes a communication circuit coupling the access point to the system backbone, and a first transceiver for wirelessly communicating with at least one of the plurality of mobile terminals on a first communication channel. In addition, the access point includes a second transceiver for wirelessly communicating with at least another of the plurality of mobile terminals on a second communication channel different from the first communication channel.

According to another aspect of the invention, a communication method is provided in a system comprising a system backbone, a mobile terminal, and an access point coupled to the system backbone for enabling wireless communications between the mobile terminal and the system backbone via the access point. The access point includes a first transceiver for communicating wirelessly via a first frequency hopping sequence, and a second transceiver for communicating wirelessly via a second frequency hopping sequence different from the first frequency hopping sequence. The method includes the steps of at least one of the first transceiver and the second transceiver broadcasting a beacon including hopping sequence data respectively corresponding to the first frequency hopping sequence or the second frequency hopping sequence; the mobile terminal responding to the beacon by transmitting to the access point a request to register; and the access point selectively permitting registration of the mobile terminal with at least one of the first transceiver and the second transceiver in response to the request to register, based on a predetermined criteria.

According to yet another aspect of the invention, a communication method is provided in a system including a system backbone, a mobile terminal, and an access point coupled to the system backbone for enabling wireless communications between the mobile terminal and the system backbone via the access point. The access point includes a first transceiver for communicating wirelessly via a first frequency hopping sequence, and a second transceiver for communicating wirelessly via a second frequency hopping sequence different from the first frequency hopping sequence. The method includes the steps of at least one of the first transceiver and the second transceiver broadcasting a beacon including hopping sequence data corresponding to both the first frequency hopping sequence and the second frequency hopping sequence; the mobile terminal selecting which of the first transceiver and the second transceiver to register with based on the hopping sequence data and responding to the beacon by transmitting to the access point a request to register; and the access point permitting registration of the mobile terminal with at least one of the first transceiver and the second transceiver in response to the request to register.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

The present invention will now be described with reference to the drawings, wherein like reference numerals are used to refer to like elements throughout.

Figure 1:
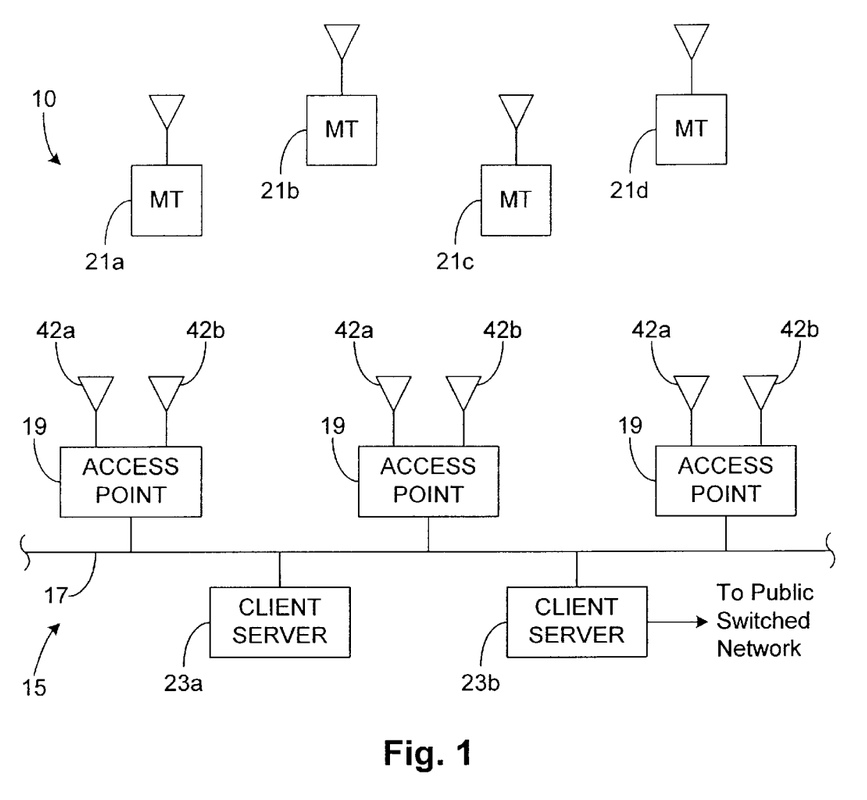
FIG. 1 is a block diagram of a wireless network in accordance with the present invention.

Referring initially to FIG. 1, a wireless network 10 is shown in accordance with an exemplary embodiment of the present invention. The network 10 includes a local area network (LAN) 15 having a system backbone 17 and a plurality of access points 19 coupled thereto. The network 10 further includes a plurality of mobile terminals (e.g., 21a thru 21d) which roam throughout the network 10.

The mobile terminals 21 register with a given access point 19 in order to carry out communications between the mobile terminal and other devices connected to the network 10. As the mobile terminals 21 move from a cell region covered by one access point 19 to a cell region covered by another access point. 19, the mobile terminals 21 register with the new access point 19 as is known. In this manner, the mobile terminals 21 are able to maintain wireless communication with the backbone 17 as they roam about.

The network 10 also includes a pair of client servers 23a and 23b coupled to the backbone 17. In the exemplary embodiment, the first client server 23a is responsible for handling processing in connection with a first application involving one or more of the mobile terminals 21. For example, the client server 23a may carry out a data transaction application such as inventory control or the like based on data which is received from the mobile terminals 21. The second client server 23b carries out a different application from that carried out by the first client server 2a. For example, the client server 23b may serve as an interface between the network 10 and a public switched telephone network for voice communications between the mobile terminals 21 and a public telephone connection as is discussed more fully below.

The backbone 17 is shown to be a hardwired data communication path made of twisted pair cable, shielded coaxial cable or fiber optic cable, for example. Alternatively, the backbone 17 could be wireless in nature so as to provide an added dimension of flexibility.

As is described more fully below, each access point 19 provides for wireless communications between devices coupled to the system backbone 17 and one or more mobile terminals (e.g., mobile terminals 21a thru 21d) included in the system 10.

Figure 2:
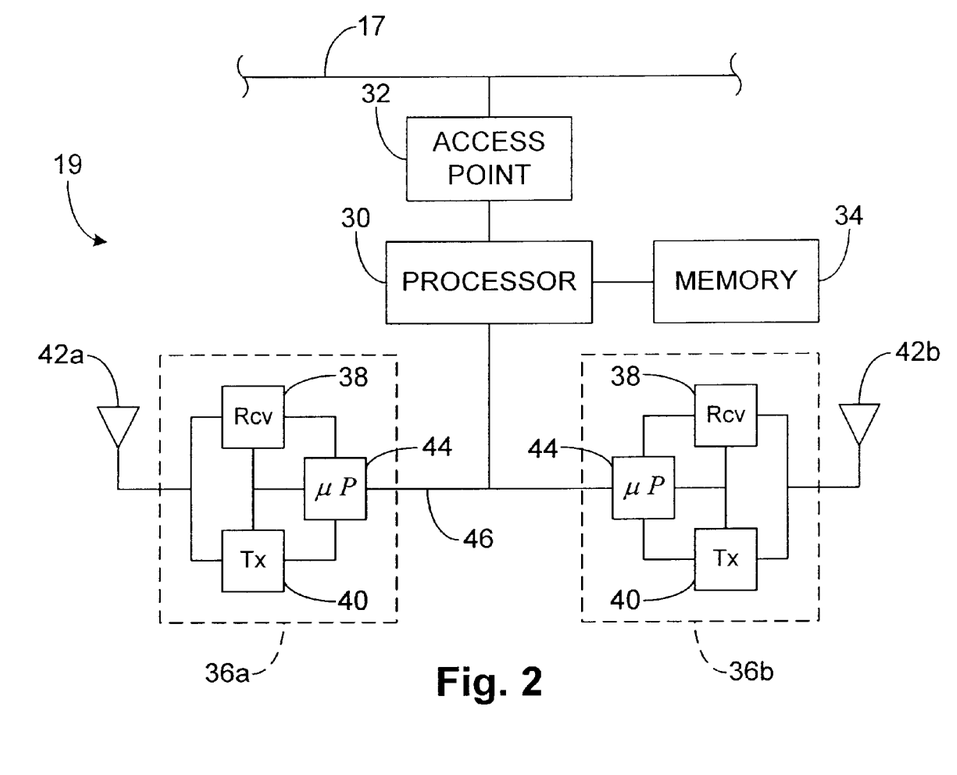
FIG. 2 is a block diagram of an access point which may be utilized in the wireless network of FIG. 1 in accordance with the present invention.

Referring now to FIG. 2, an exemplary access point 19 is shown. The access point 19 in accordance with the present invention includes a main processor 30 programmed to carry out the various control and operational functions described herein. The main processor 30 is coupled to the system backbone 17 by way of a network interface 32. The network interface 32 permits the main processor 30 to send and receive data packets via the system backbone 17 using conventional techniques.

The main processor 30 is also coupled to a main memory 34 included in the access point 19. The memory 34 includes programming stored therein which, when executed by the processor 30, permits the access point 19 to operate as described herein. Those having ordinary skill in the art of programming will appreciate the manner in which the access point 19 may be programmed to operate as described based on the present disclosure. Accordingly, additional detail regarding the specific programming has been omitted for sake of brevity.

In addition, the memory 34 includes therein a look-up table which is described in more detail below in connection with FIGS. 3 and 5. Generally speaking, the look-up table stored within the memory 34 enables the access point 19 to maintain a record insofar as how the various mobile terminals 21 registered to the access point 19 correspond to and are serviced by multiple transceivers included in the access point 19.

More,specifically, each access point 19 includes a plurality of wireless transceivers (e.g., 36a and 36b). Such transceivers 36 may be radio frequency (RF), optical, infrared, etc., or some combination thereof. In the exemplary embodiment, each access point 19 includes a pair of RF transceivers 36a and 36b. As shown, each transceiver 36a, 36b includes its own respective receiver 38 for receiving wireless RF communications from a mobile terminal 21. In addition, each transceiver 36a, 36b includes its own respective transmitter 40 for transmitting wireless RF communications to a mobile terminal 21. Wireless communications are received and transmitted by the transceivers 36a, 36b via respective antennas 42a, 42b which are connected to the input/output of the receiver 38/transmitter 40.

Each of the transceivers 36a, 36b further includes a microprocessor 44 coupled to the corresponding receiver 38 and transmitter 40 for controlling the transceiver in a conventional manner. It will be appreciated that each of the transceivers 36 individually are conventional in configuration and general operation. Accordingly, further details regarding their respective configuration has been omitted.

The transceivers 36a, 36b are coupled to the main processor 30 via a local bus 46. Information packets which are received via the transceivers 36a, 36b, intended to be forwarded onto the system backbone 17, are communicated by the respective local microprocessor 44 to the main processor 30 via the bus 46. The main processor 30 then forwards each packet onto the system backbone 17 to the address specified in the packet.

Information packets which are received by the main processor 30 from the system backbone 17 are reviewed by the processor 30 to determine if the information packets are directed to a mobile terminal 21 registered to the access point 19. As is described more fully below, the processor 30 reviews a look-up table in the memory 34 to determine if the mobile terminal 21 to which the packet is addressed is registered, i.e., appears as active in the look-up table. If so, the processor 30 determines from the look-up table which particular transceiver (e.g., 36a or 36b) is assigned to communicating with particular mobile terminal 21 to which the packet is addressed. Based on such determination, the processor 30 forwards the received packet to the processor 44 of the appropriate transceiver 36 via the bus 46. In turn, the processor 44 causes the respective transmitter 40 to transmit the received packet to the destination mobile terminal 21 via the antenna 42a.

In order to permit simultaneous operation of the transceivers 36 included in a given access point, each transceiver (e.g., 36a, 36b) is configured to operate on a different communication channel. Much like different access points 19 typically operate using different communication channels in order to avoid interference and/or cross-talk, each transceiver 36 in a given access point 19 preferably is designed to operate on a channel which does not interfere with communications occurring on a channel on which the other transceivers 36 in the access point 19 operate. For example, each of the transceivers 36a, 36b may employ conventional frequency hopping techniques except using different frequency hopping sequences. As another example, each of the transceivers 36a, 36b may employ direct sequence spread spectrum techniques with different PN sequences. In yet another example, one of the transceivers 36 may employ frequency hopping and the other may employ PN coding. As yet another example, the transceivers 36 may simply operate in different frequency bands or in the same frequency band but using different modulation techniques.

A variety of different types of communication channels may be employed by the transceivers 36 in order to permit simultaneous or substantially simultaneous operation. Channels which produce minimum interference and cross-talk are preferred, and it will be apparent to one having ordinary skill in the art based on the present disclosure how such channels may be selected.

The transceivers 36 may be housed entirely within the main housing of the access point 19. Alternatively, one or more of the transceivers 36 may be made up of a peripheral device such as a PCMCIA card radio as is known. Hence, for example, the access point 19 may include two or more peripheral ports (e.g., PCMCIA card slots) for receiving respective transceiver radios. This provides a degree of flexibility in the number of transceivers 19 which are included in an access point 19.

First Example

Figure 3:
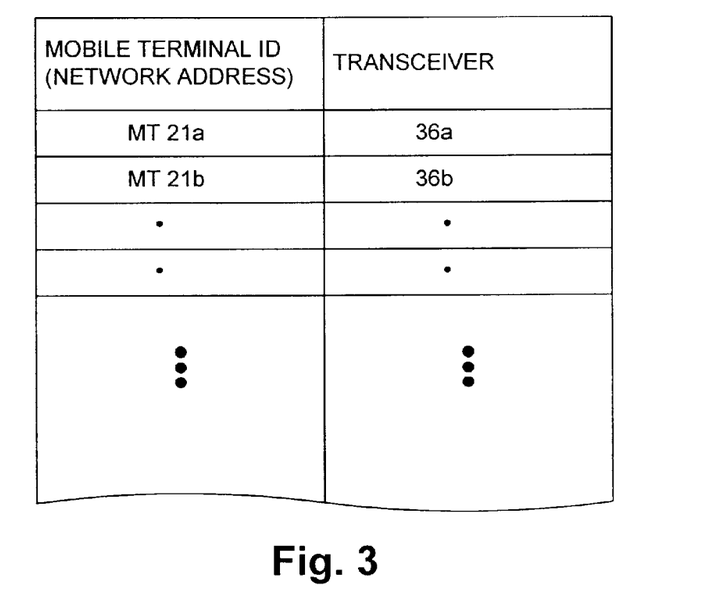
FIG. 3 represents a look-up table stored in an access point in accordance with an embodiment of the present invention.

Referring now to FIG. 3, an exemplary look-up table stored in the memory 34 of a given access point 19 is shown. According to a first example of the present invention, the look-up table is represented by two columns. The first column contains an entry for each of the mobile terminals 21 which are currently registered with the access point 19. The second column contains a corresponding entry indicating which particular transceiver 36 in the access point 19 has been assigned to carry out communications with the mobile terminal 21 identified in the first column. For example, the look-up table in FIG. 3 indicates that mobile terminals 21a and 21b are registered with the access point 19. Transceiver 36a has been assigned to communicate with the mobile terminal 21a and transceiver 36b has been assigned to communicate with the mobile terminal 21b.

There are a variety of ways in which a mobile terminal 21 may become registered with an access point 19 and assigned to a corresponding transceiver 36. In this first example, the transceiver 36a is considered the primary transceiver and is assigned to any mobile terminals 21 requesting registration up to a predefined limit (i.e., number of mobile terminals). Such limit may be based on the quantity of air traffic the transceiver 36a may handle before delay times become perceptible to the operator of a mobile terminal 21. In the event such limit is reached, as determined by the processor 30 based on the contents of the look-up table, subsequent mobile terminals 21 requesting registration are assigned to the secondary transceiver 36b.

When a mobile terminal 21 first enters the system 10 upon powering up, or upon a mobile terminal 21 roaming into a new cell region, the mobile terminal 21 is configured to attempt to register with an access point 19 using known techniques. For example, the mobile terminal 21 broadcasts a request to register packet. In the event the primary transceiver 36a has not reached its predefined number of mobile terminals, the main processor 30 enables the primary transceiver 36a to respond to the request to register from the mobile terminal 21. The mobile terminal 21 then registers with the transceiver 36a in a conventional manner, and the main processor 30 updates the look-up table in the memory 34. During such time, the main processor 30 disables the secondary transceiver 36b by causing it not to respond to the request to register broadcast by the mobile terminal 21.

If, on the other hand, the primary transceiver 36a currently is at the predefined limit, the processor 30 causes the transceiver 36a not to respond to the request to register. At the same time, the processor 30 enables the secondary transceiver 36b in order that the mobile terminal 21 is then registered via the transceiver 36b.

In a passive type registration system, the processor 30 may cause the primary transceiver 36a to broadcast a beacon periodically, the beacon indicating whether registration is possible. A mobile terminal 21 desiring to register will receive such beacon and respond in a conventional manner. Upon such time that the primary transceiver 36a reaches the predefined limit, the processor 30 instructs the transceiver 36a to modify the beacon such that registrations are not possible. In its place, the processor 30 causes the transceiver 36b periodic beacon to indicate registration availability in order that mobile terminals may register via the secondary transceiver 36b.

Accordingly, the access point 19 with two or more transceivers 36 capable of operating simultaneously has substantially greater capacity as compared to conventional access points. Hence, fewer access points and corresponding network connections are necessary within the system.

Each mobile terminal 21 preferably is capable of communicating with the access point 19 on different channels corresponding to the channels on which the transceivers (e.g., 36a, 36b) are operating. As is known, this can be done internally within the mobile terminal 21 by altering the particular hopping sequence, PN code, etc. based on the information provided by the respective transceiver 36 during registration. For example, the response to the request for registration may include the particular hopping sequence or PN code utilized by the transceiver 36. Alternatively, the beacon transmitted by the transceiver 36 may include such information.

Furthermore, mobile terminals 21 having dynamically modifiable communication parameters may be utilized. For example, copending application Ser. No. 08/566,502 entitled "Cellular Communication System with Dynamically Modified Data Transmission Parameters", filed Dec. 4, 1995, describes mobile terminals capable of receiving and transmitting information via different channels. The disclosure of the '502 application is incorporated herein by reference.

Figure 4:
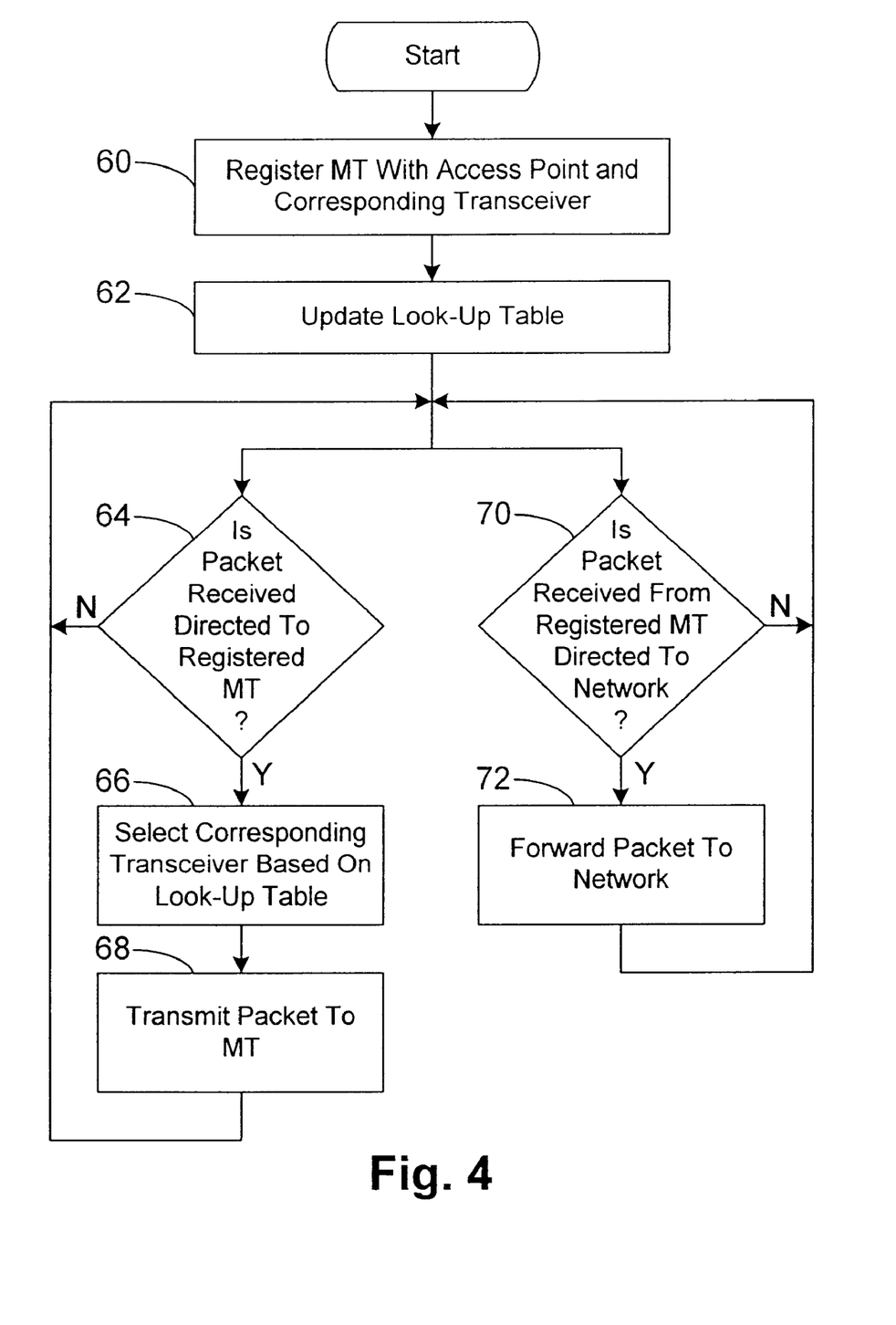
FIG. 4 is a flowchart describing the operation of the access point in accordance with an embodiment of the present invention.

FIG. 4 is a flowchart summarizing the above described operation of an access point 19 according to the first example of the present invention. In step 60, a mobile terminal 21 attempting to register with the access point 19 is registered based on the above-described criteria (e.g., based on whether the primary transceiver 36a is at capacity or not). Next, in step 62 the processor 30 updates its look-up table in memory 34 by creating an entry for the registered mobile terminal 21 and an corresponding entry identifying which transceiver 36 has been assigned to the mobile terminal 21.

In step 64, the processor 30 determines if a packet has been received from the system backbone 17 directed to a registered mobile terminal 21. Specifically, the processor 30 refers to its look-up table in the memory 34 to see if the mobile terminal 21 identified in the packet is included therein. If yes, the processor 30 selects the corresponding transceiver 36 assigned to the mobile terminal 21 as indicated in the look-up table and as represented in step 66. Next, in step 68 the processor 30 forwards the packet to the processor 44 of the assigned transceiver 36 in order that it may be transmitted to the mobile terminal 21 via the antenna 42.

Concurrent with steps 64–68, the processor 30 determines in step 70 whether a packet has been received from a registered mobile terminal 21 via one of the transceivers 36. Specifically, packets received via the transceiver 36a or 36b are forwarded to the processor 30 via the bus 46. The processor 30 then forwards the packets onto the system backbone 17 as represented by step 72.

Although the particular transceiver which is assigned to a mobile terminal 21 is based on the number of mobile terminals 21 currently assigned to the primary transceiver in the above example, other variations are well within the scope of the invention. For example, the processor 30 may attempt to balance the amount of information communicated via the respective transceivers 36 by monitoring the activity thereof. A transceiver 36 which has less activity than another transceiver will be given priority with respect to new registrations, for example.

Second Example

In a second example of the invention, the two or more transceivers 36 in a given access point 19 are useful for controlling operator perceptible delays for different applications. As an example, when an operator is performing a data collection application using a mobile terminal 21, a delay may not become perceptible until it approaches 300 milliseconds. However, if the operator is communicating orally in a pseudo-full duplex telephone communication mode using a mobile terminal 21, a 200 milliseconds delay is extremely perceptible.

Thus, in this second example the transceiver 36a in the access point 19 is dedicated to data communications (e.g., with the first client server 23a). The transceiver 36b, on the other hand, is dedicated to voice data communications (e.g., with the second client server 23b). Alternatively, different mobile terminals 21 may have different transceivers 36 dedicated to the different types of communications. Mobile terminals 21 suitable for carrying out both data communications and voice data communications are described, for example, in copending application Ser. No. 08/867,076, entitled "Portable Data Collection Network with Telephone and Voice Mail Capability", filed on Jun. 2, 1997. The entire disclosure of the '076 application is hereby incorporated herein by reference.

Figure 5:
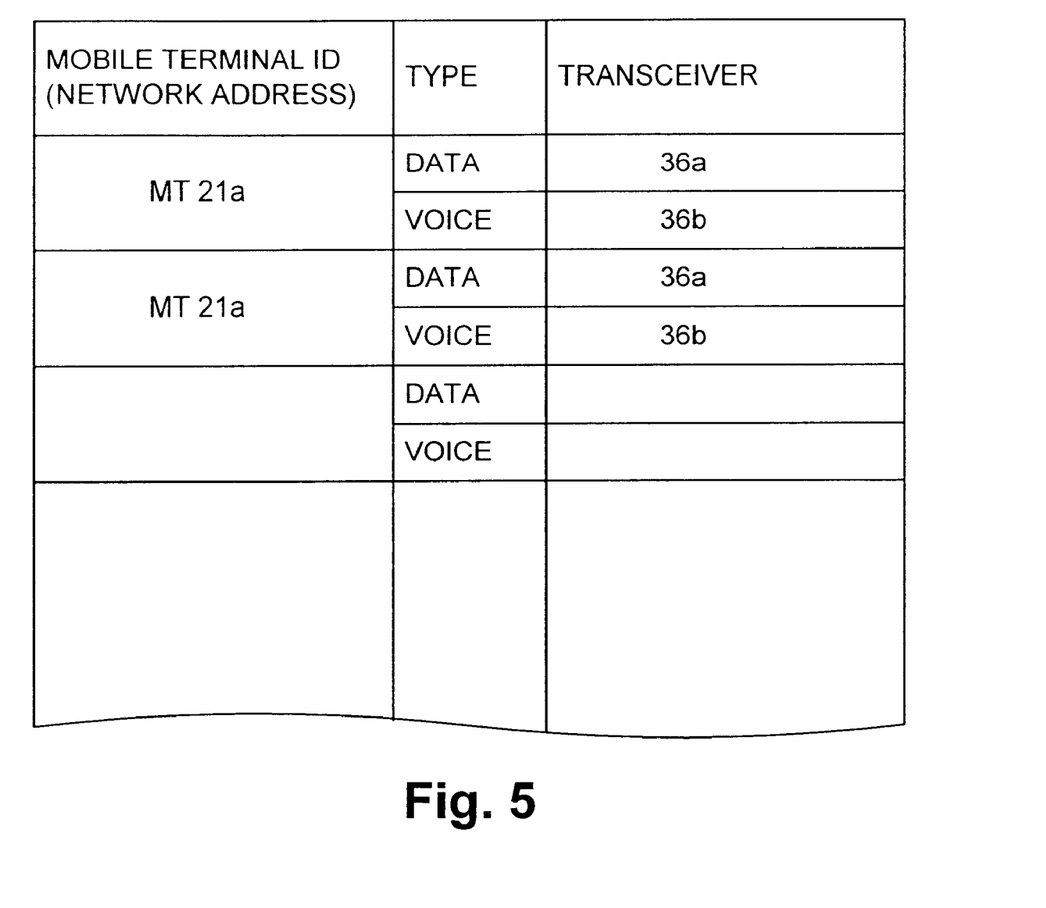
FIG. 5 represents a look-up table stored in an access point in accordance with another embodiment of the present invention.

FIG. 5 illustrates the access point look-up table structure in the memory 34 in accordance with the second example. A mobile terminal 21 which is registered with the access point 19 is identified in the left column of the table. In the right column, the table identifies which transceiver 36 is responsible for handling data and voice communications for the particular mobile terminal 21. In the example, shown in FIG. 5, the transceiver 36a is responsible for handling data communications for the mobile terminal 21a. The transceiver 36b is responsible for handling voice data communications via the mobile terminal 21.

Figure 6:
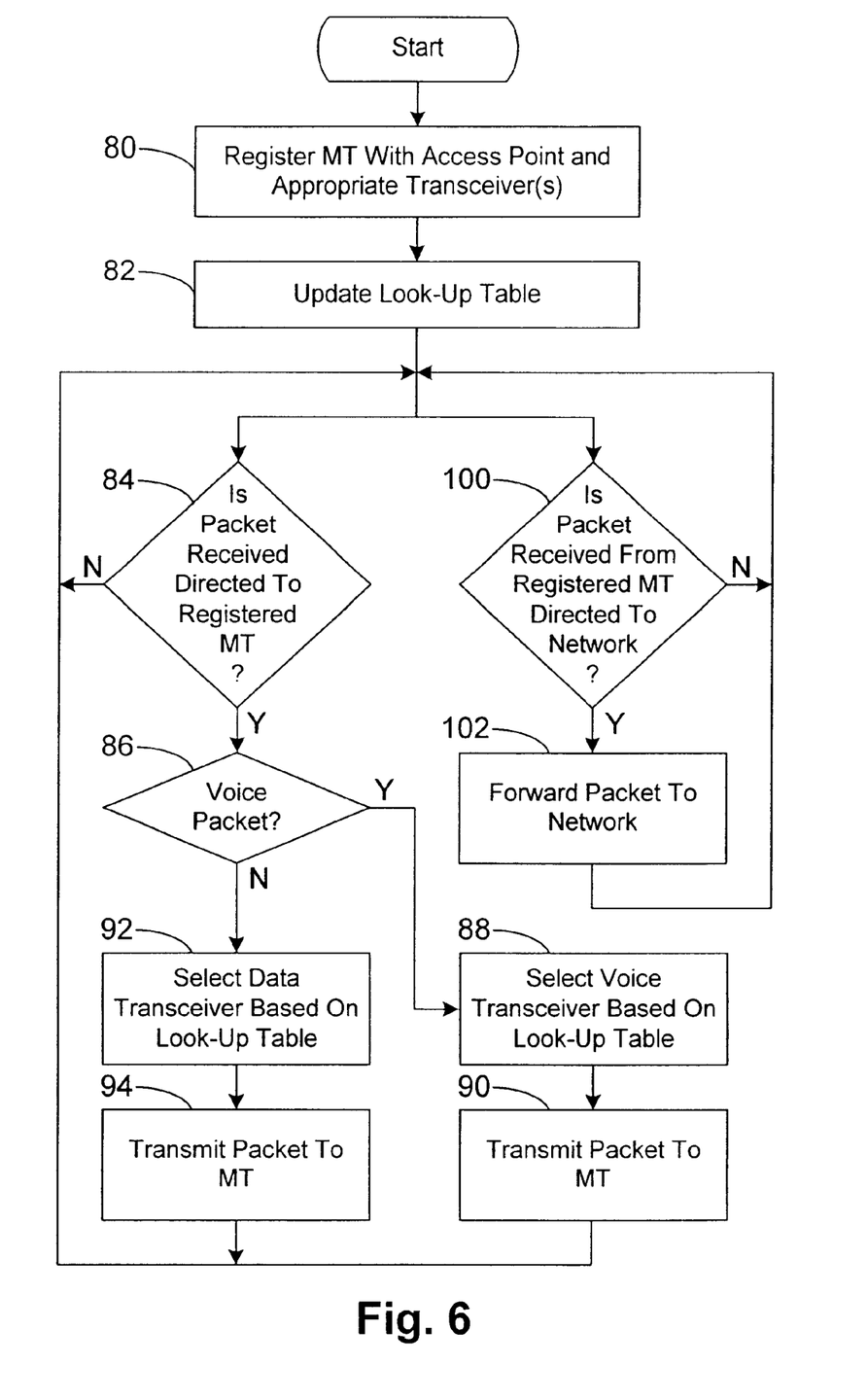
FIG. 6 is a flowchart describing the operation of the access point in accordance with another embodiment of the present invention.

FIG. 6 is a flowchart describing the operation of a given access point 19. In step 80, a mobile terminal 21 seeking registration registers with the access point 19. In this example, registration may be carried out between the transceiver 36a and the mobile terminal 21 in a conventional manner via a registration request or beacon. As part of the registration procedure, however, the transceiver 36a is configured also to notify the mobile terminal 21 as to which particular channel it is communicating on for purposes of conventional data, and which particular channel the transceiver 36b is communicating on for purposes of voice data. As a result, the mobile terminal 21 knows which respective channels to transmit and receive data and voice data on. An exemplary protocol by which voice data and conventional data communications may be established and carried out is described in the aforementioned '076 application.

In step 82, the access point 19 updates its look-up table in the memory 34 by adding the newly registered mobile terminal 21a and identifying the corresponding transceivers 36 for data and voice data. In step 84, the access point 19 determines whether a packet has been received from the system backbone 17 which is directed to a mobile terminal 21 and which is registered to the access point 19. Specifically, the processor 30 determines if the mobile terminal 21 identified as the destination address in the packet is included in the look-up table stored in the memory 34.

If yes in step 84, the processor 30 proceeds to step 86 where it determines whether the packet contains voice data. In the exemplary embodiment, the client server 23b or other device in the system which transmits voice data to the mobile terminal 21 is configured to include a flag in the packet identifying the packet as containing voice data. In step 86, the processor 30 looks for the presence of such flag. If the flag is present in the received packet, the processor 30 proceeds to step 88 in which it refers to the look-up table in memory 34 to determine which particular transceiver 36a, 36b is associated with voice data for that particular mobile terminal 21. The processor 30 then forwards the packet to the particular transceiver 36 whereupon the packet is transmitted to the mobile terminal 21 via the antenna 42 as represented in step 90.

If in step 86 it is determined that the received packet is not a voice data packet, the processor 30 proceeds to step 92 in which it determines the transceiver 36 associated with carrying out conventional data applications with the mobile terminal 21 based on the look-up table. The processor 30 then forwards the packet to that particular transceiver 36 whereupon the packet is transmitted to the mobile terminal 21 via the antenna 42 as represented in step 94.

Concurrent with steps 84–94, the processor 30 determines in step 100 whether a packet has been received from a registered mobile terminal 21 via one of the transceivers 36. Specifically, packets received via the transceiver 36a or 36b are forwarded to the processor 30 via the bus 46. The processor 30 then forwards the packets onto the system backbone 17 as represented by step 102.

Because the delay of voice data packets is more critical, the processor 30 may limit the quantity of new registrations which are permitted to utilize a transceiver 36 dedicated to voice data. Alternatively, the processor 30 may limit the data traffic conversations occurring via the transceiver 36 dedicated to voice data communications. For example, in a protocol which involves ring and answer packets as discussed in the above-mentioned '076 application, the processor 30 may be configured to respond to a ring packet with a predefined packet representing a busy signal.

Third Example

The third example of the present invention is similar to the first example, with the exception that the transceivers 36a and 36b operating on different channels represent different RF technologies. For example, in an environment where mobile terminals 21 using an old RF technology are gradually being replaced by mobile terminals 21 using a new RF technology, it is desirable that the access points 19 provide some degree of compatibility between the different technologies.

For example, the transceiver 36a may communicate on a first channel with a first modulation technique, at a first data rate and with a first set of mobile terminals 21 according to a particular technology. The transceiver 36b may communicate on a second channel with a second modulation technique, at a second data rate and with a second set of mobile terminals 21 according to a different technology. In this manner, the access point 21 provides a migration path to a new technology without immediately making the existing equipment obsolete.

Registration in Frequency Hopping System
(Example A)

In a conventional frequency hopping system (e.g., in accordance with Standard 802.11), registration typically occurs as follows:

1. The transceivers in the different access points are on different hopping sequences and/or random phases of the same hopping sequence.

2. The mobile terminal will listen until it hears a periodic beacon from an access point. The beacon includes hop sequence data for the access point. The mobile terminal may wait on a channel known to be serviced by an access point and/or scan among several channels.

3. Upon receiving such a beacon, the mobile terminal synchronizes its own transceiver to the access point transmitting the beacon based on the hop sequence data included in the beacon. The mobile terminal then transmits a "request to register" packet to the access point.

4. The access point receives the "request to register" packet and responds to the mobile terminal with an "OK to register" packet as is known.

Figure 7:
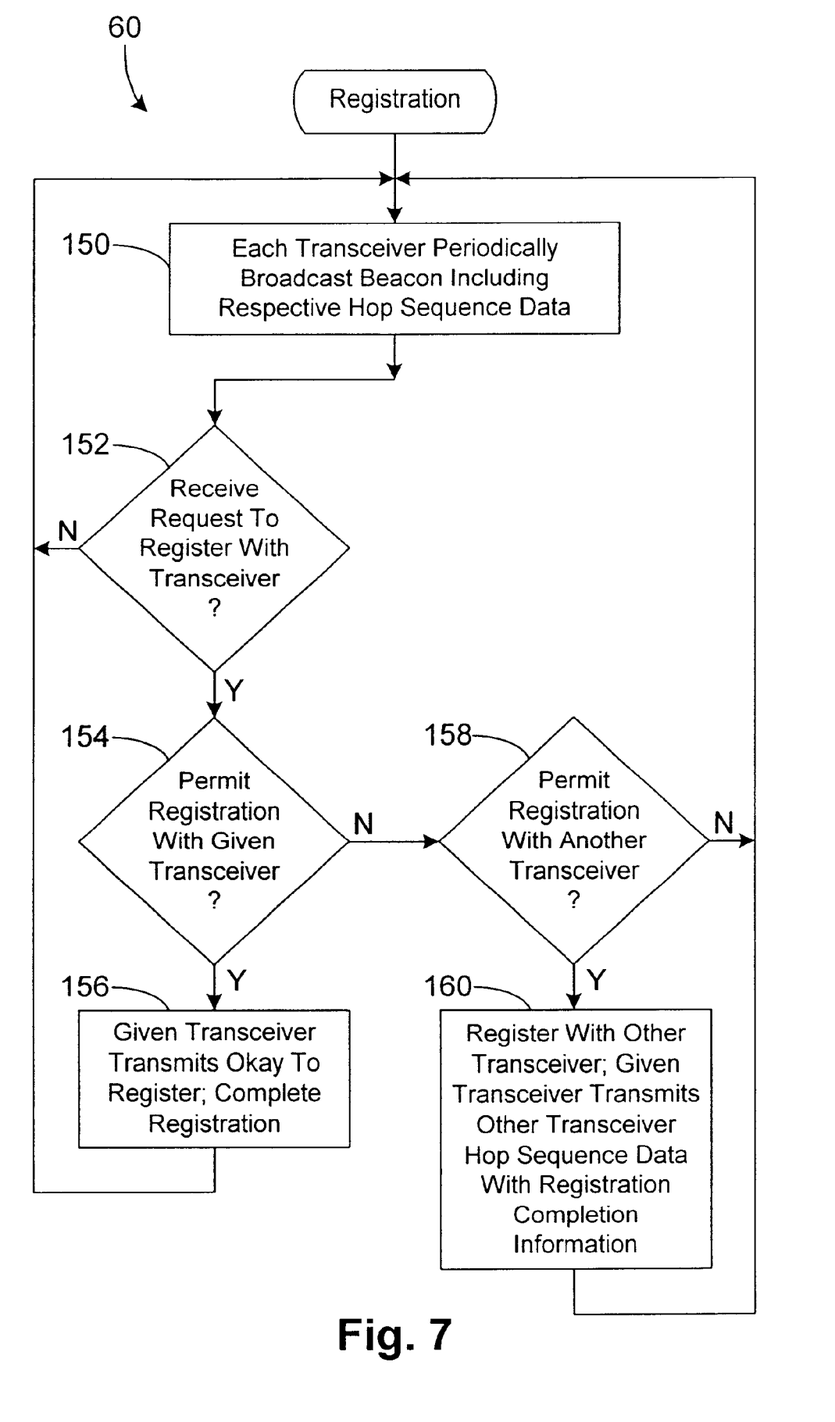
FIG. 7 is a flowchart illustrating an exemplary registration process for a frequency hopping system in accordance with the present invention.

According to a particular embodiment of the present invention, each transceiver 36a, 36b in the access point 19 operates on a different channel using its own unique frequency hopping sequence and/or random phase of the same hopping sequence. Referring, for example, to the example discussed above with respect to FIG. 4, registration in step 60 involves a mobile terminal 21 attempting to register with the access point 19 via one of the transceivers 36a and 36b. FIG. 7 illustrates an exemplary procedure for carrying out such registration. It will be appreciated that although, FIG. 4 illustrates the registration step 60 as a discrete step, such step actually is carried out substantially continuously during the operation of the access point 19.

As mentioned above, the main processor 30 controls which particular transceiver 36 a mobile terminal 21 is permitted to register with during step 60. Referring to FIG. 7, in step 150 each of the transceivers 36a, 36b is prompted to broadcast periodically a beacon including respective hop sequence data. Such beacons may occur simultaneously or be staggered. Next, in step 152 the main processor 30 determines if a "request to register" packet has been received by either of the transceivers 36a, 36b. Specifically, each of the transceivers 36a, 36b is configured to notify the main processor 30 in step 152 in the event a "request to register" packet has been received.

If a "request to register" is received in step 152, the process proceeds to step 154. Otherwise, the process returns to step 150. In step 154, the main processor 30 decides whether to permit registration between the mobile terminal 21 and the particular transceiver 36 which received the "request to register". Such determination can be based on any of the various criteria discussed herein, such as amount of mobile terminals currently assigned to the particular transceiver, the amount or type of data traffic handled by the particular transceiver, etc. In the event registration is to be permitted between the mobile terminal 21 and the particular transceiver 36 which received the "request to register", the main processor 30 in step 156 instructs the particular transceiver 36 to transmit an "OK to register" packet to the mobile terminal 21 in order to complete registration. Then, in step 62 (FIG. 4), the main processor 30 updates its look-up table accordingly.

If, on the other hand, the main processor 30 decides not to permit registration in step 154 based on its predetermined criteria, the main processor 30 proceeds to step 158 in which it determines whether to permit registration via another of the transceivers 36a, 36b which did not receive the "request to register". For example, if the transceiver 36a received the "request to register" but presently is at full capacity with respect to number of mobile terminals being serviced, etc., the main processor 30 may choose to register the mobile terminal 21 which transmitted the "request to register" with the transceiver 36b. More particularly, the main processor 30 proceeds to step 160 in which it registers the mobile terminal 21 with the transceiver 36b. Specifically, the main processor 30 instructs the transceiver 36a to transmit to the mobile terminal 21 an "OK to register". In this case, however, the "OK to register" includes the hop sequence data of the transceiver 36b. The mobile terminal 21 is configured to recognize that registration has been handed off to another transceiver in the access point 19 (e.g., by the presence of the new hop sequence data in the "OK to register"). The mobile terminal then utilizes such new hop sequence data to synchronize itself with the transceiver 36b. In step 62 (FIG. 4), the main processor 30 then updates its look-up table to indicate that the transceiver 36b is assigned to the newly registered mobile terminal 21.

Following step 160, the system returns to step 150. Alternatively, if registration is not permitted with any other transceivers in step 158, the system returns to step 150.

Numerous variations are possible in the procedure shown in FIG. 7 without departing from the scope of the invention. For example, the "OK to register" packet transmitted in step 160 may be replaced by a packet notifying the mobile terminal 21 that registration with the particular transceiver (and hence hopping sequence) associated with the "request to register" is not permitted. Instead, the packet contains information identifying the hop sequence of another of the transceivers (e.g., transceiver 36b) with a recommendation that the mobile terminal 21 synchronize itself to the other transceiver and attempt to register by transmitting a "request to register". In other words, registration with one of the other transceivers 36 is not done automatically, but rather the mobile terminal 21 is instructed to try to register with one of the other transceivers.

According to another variation, the main processor 30 in step 154 may at least temporarily allow registration of the mobile terminal 21a via the particular transceiver 36 which received the "request to register" via steps 154 and 156. Subsequently, however, the main processor 30 causes the particular transceiver 36 to transmit a packet instructing the mobile terminal 21 to synchronize itself with the hopping sequence of another of the transceivers 36 in the access point 19. Such instruction packet would include the hopping sequence data of the other transceiver, and would prompt the mobile terminal 21 to initiate registration with the other transceiver by transmitting a "request to register" based on the newly acquired hopping sequence data.

In yet another variation, the beacons which are broadcast by each of the transceivers 36 in step 150 are modified to include the hopping sequence data of all of the transceivers 36 in the access point 19. The mobile terminal 21 is configured to select from among the different hopping sequences provided in the beacon. The mobile terminal 21 then synchronizes its transceiver with the selected hopping sequence and attempts to register by transmitting a "request to register".

The beacons in such case may also include information about the usage of the respective transceivers 36 so that the mobile terminal 21 can select with which transceiver to register according to network protocol. For example, if the transceiver 36a is dedicated to data communications and the transceiver 36b is dedicated to voice communications, such information is included in the beacon of each transceiver. If the mobile terminal 21 seeking registration is dedicated to voice communications, it will use such information included in the beacons of either transceivers 36a or 36b in order to synchronize with transceiver 36b and attempt registration.

The main processor 30 may instead be configured to allow the mobile terminals 21 to determine which transceiver 36 to register with based on the current data traffic loads for the respective transceivers. Thus, for example, the main processor 30 in such case is programmed to track the current data traffic load for the respective transceivers. In step 150, the beacons which are broadcast by each of the transceivers include the hopping sequence data and the corresponding current data traffic for all of the respective transceivers. The mobile terminal 21 can then use such information to decide with which transceiver to attempt to register.

Registration in Frequency Hopping System
(Example B)

Figure 8A:
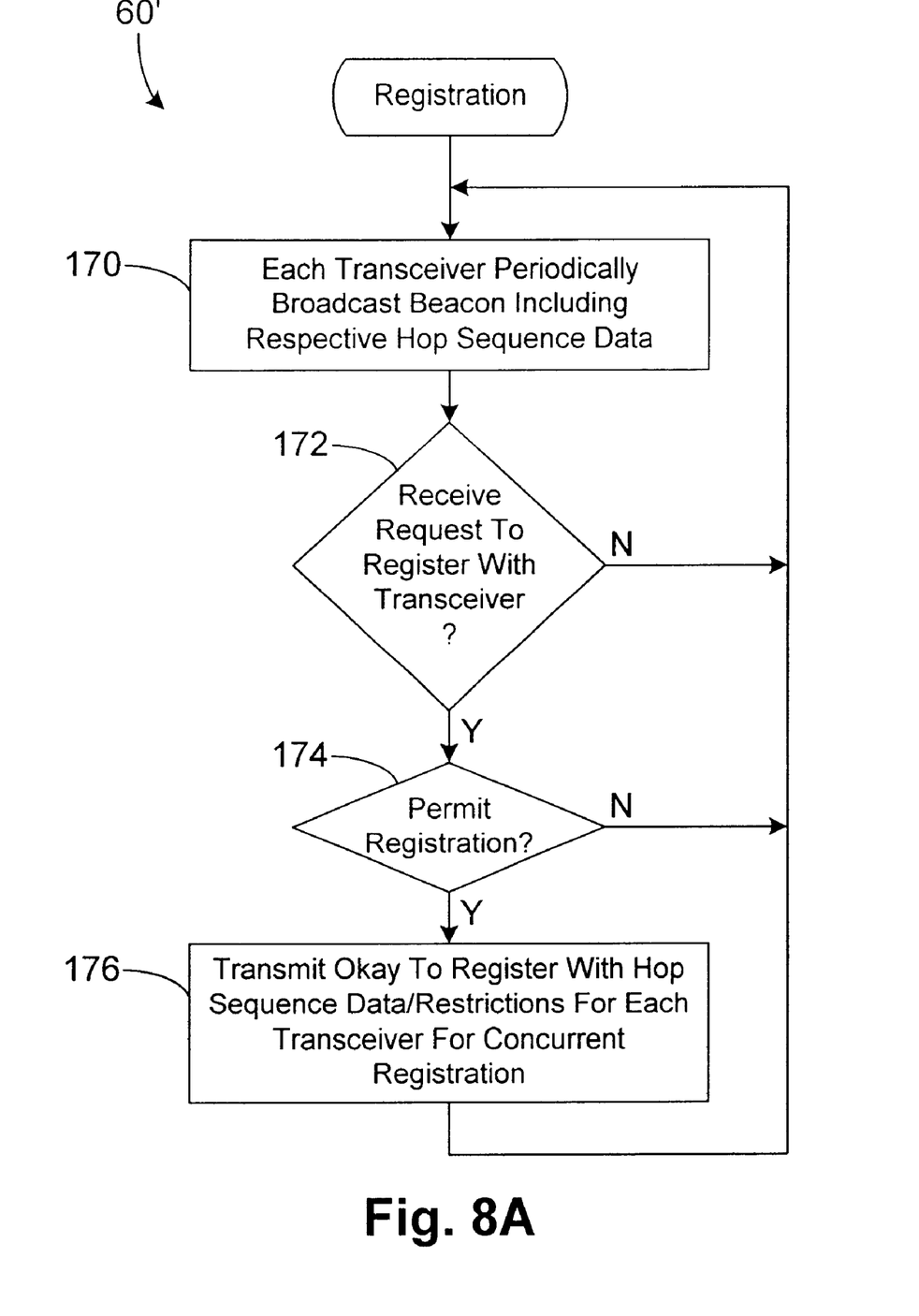
FIG. 8A is a flowchart illustrating another registration process for a frequency hopping system in accordance with the present invention.

FIG. 8A illustrates another registration procedure which may be utilized in an embodiment of the present invention in which the different transceivers 36 in an access point operate using different frequency hopping sequences. This particular procedure make involves mobile terminals which may request that unsolicited data directed to the mobile terminal be buffered by the access point until requested by the mobile terminal. For example, many mobile terminals are battery powered and enter a low power consumption "sleep mode" in periods not requiring continuous use.

Conventionally, it is known for mobile terminals communicating via an access point to be in a "sleep mode" or other type mode in which the mobile terminal does not wish to receive unsolicited data from the access point. During a sleep mode, the mobile terminal will reduce power consumption by shutting down non-critical components. Periodically, the mobile terminal will awaken itself and listen for (i.e., attempt to receive) a beacon from the access point. The beacon will have a bit corresponding to the particular mobile terminal set if there is data buffered for the mobile terminal at the access point. The mobile terminal then polls the access point for the buffered data. When a mobile unit is in a sleep mode, the access point will not send unsolicited data to the mobile terminal because it is not likely to be received.

The present invention utilizes two or more the transceivers 36 in the access point 19 to eliminate the need to reawaken one or more of the transceivers periodically to determine if there exists unsolicited data buffered by the access point 19. FIG. 8A illustrates an exemplary registration routine 60' which can be utilized in the process shown in FIG. 4, for example. Beginning in step 170, the main processor 30 causes each of the transceivers 36a, 36b to broadcast beacons periodically. The beacon from a respective transceiver 36 includes the hopping sequence data for that particular transceiver 36. Next, in step 172 the main processor 30 determines if a "request to register" has been received via any of the transceivers 36. If yes, the main processor 30 proceeds to step 174 in which it determines whether to permit registration based on any of the aforementioned criteria, for example.

If registration is to be permitted as determined in step 174, the main processor 30 instructs the particular transceiver 36 which received the "request to register" to respond by transmitting an "OK to register" as represented in step 176. The "OK to register" in this case includes the hopping sequence data for each of the respective transceivers 36, or a subset thereof, included in the access point 19. In addition, the "OK to register" in step 176 also may include information which informs the mobile terminal seeking registration of any restrictions on the use of the respective transceivers 36. For example, one transceiver 36 may be dedicated to performing voice communications whereas another transceiver 36 may be dedicated to performing data communications.

The "OK to register" in this instance notifies the mobile terminal 21 that it is concurrently registered with each of the transceivers 36 included in the access point 19 or a subset thereof. The mobile terminal 21 is configured to begin tracking the hopping sequence of each of the transceivers identified in the "OK to register" based on the hopping sequence data provided thereby. Such tracking of each of the hopping sequences can be carried out by the mobile terminal processor even while the mobile terminal is in a sleep mode. Following step 176, the main processor 30 in step 62 updates its look-up table to reflect that the mobile terminal 21 is registered with each of the transceivers 36.

There are a number of capabilities which arise as a result of the mobile terminal 21 being registered concurrently with two or more of the transceivers 36 in a given access point 19. For example, the mobile terminal 21 may transmit "sleep mode" identification packets to each of the transceivers 36 with which it is registered via the respective hopping sequences. In such manner, the access point 19 will not transmit unsolicited data received by the access point 19 and addressed to the mobile terminal 21 via any of the transceivers 36. The mobile terminal 21, on the other hand, can transmit unsolicited data to any of the transceivers 36. For example, conventional data may be transmitted to the transceiver dedicated to conventional data communication and voice data may be transmitted to the transceiver dedicated to handling voice data.

As another example, a system requirement may be that a mobile terminal 21 cannot request that a transceiver 36 dedicated to voice communications buffer unsolicited data. In other words, a mobile terminal 21 may not go into a sleep mode with respect to a transceiver 36 handling voice communications with which the mobile terminal 21 is registered. Accordingly, the mobile terminal 21 will primarily remain configured to receive communications from the dedicated voice transceiver 36. The mobile terminal 21 will consequently not receive any beacons from the other transceivers 36 with which it is concurrently registered to be able to determine if unsolicited data has been received and buffered. According to the present invention, it is possible to use the beacon transmitted from the transceiver 36 dedicated to voice communications to notify the mobile terminal 21 of such unsolicited data received by another transceiver.

Figure 8B:
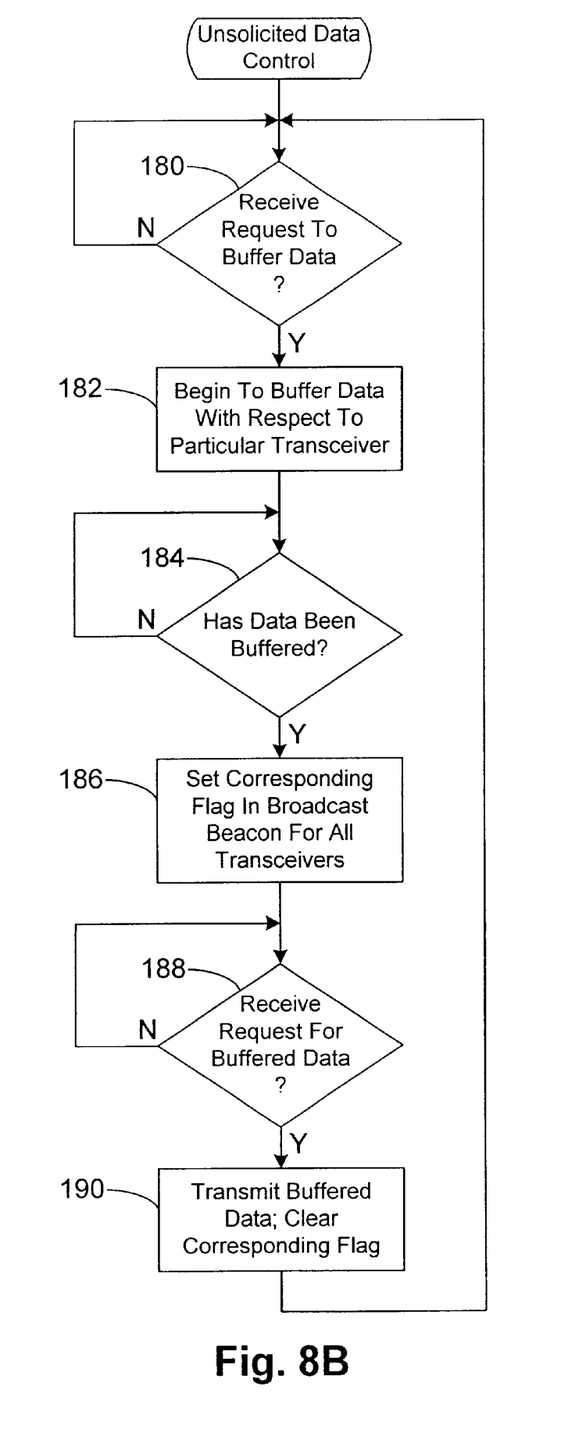
FIG. 8B is a flowchart representing a protocol for buffering and transmitting unsolicited data in accordance with the present invention.

More specifically, FIG. 8B provides an algorithm carried out by the access point 19 and mobile terminal in the case of concurrent registration with multiple transceivers 36 in the access point 19. In step 180, the main processor 30 of the access point determines if it has received a request from the mobile terminal to buffer unsolicited data with respect to one or more of the transceivers 36. Such request may be an active request received via one of the transceivers 36. Alternatively, such request may be as a result of the mobile terminal 21 not responding to polling transmitted by a respective one of the transceivers 36.

If the response in step 180 is yes, the main processor 30 causes the access point 19 to begin buffering data received by the access point 19 and directed to the mobile terminal 21 via the respective transceiver 36, as represented in step 182. Next, in step 184 the main processor 30 keeps track of whether any data has actually been received and buffered. If yes, the main processor 30 in step 186 instructs each of the transceivers 36 with which the mobile terminal 21 is concurrently registered to set a corresponding flag or bit in its beacon to indicate the presence of buffered data. Such flag or bit would indicate the particular transceiver 36 via which the buffered data was received/directed, and the corresponding mobile terminal 21. Thus, beginning in step 186 the beacons that are broadcast from each of the transceivers 36 in the access point with which the mobile terminal 21 is concurrently registered will include information indicating whether buffered data has been received.

Accordingly, the mobile terminal 21 may be configured to receive a beacon from one of the transceivers 36 and still learn that buffered data has been received with respect to another of the transceivers 36. The beacons broadcast from each of the transceivers 36 include information regarding data buffered relative to the other transceivers 36. This avoids the need for the mobile terminal 21 to reawaken periodically with respect to the registration with the other transceivers in order to receive a beacon corresponding to the other transceivers 36.

If a mobile terminal 21 wants to retrieve data which has been buffered with respect to another one of the transceivers 36, in step 188 the mobile terminal 21 transmits a request for buffered data to the access point 21. Such request may be made using the particular transceiver 36 for which the data has been buffered, such as by awakening the mobile terminal out of the sleep mode and configuring the mobile terminal 21 to transmit in accordance with the corresponding hopping sequence. Alternatively, the mobile terminal 21 may be configured to transmit the request via another of the transceivers with which it is concurrently registered. The request identifies to the main processor 30 the particular transceiver 36 with respect to which the requested data has been buffered. It is noted that because the mobile terminal 21 is tracking the hopping sequences of each of the transceivers 36, it is able to reconfigure itself as needed.

Upon receiving such request, the access point 19 in step 190 causes the data buffered in the access point to be transmitted to the mobile terminal 21 as requested. Such transmission may occur via the transceivers 36 with respect to which the data has been buffered provided the mobile terminal 21 has configured itself to receive such data using the corresponding hopping sequence. Alternatively, the mobile terminal 21 may choose to use another of the transceivers 36 in which case the main processor 30 redirects the buffered data so as to be transmitted via another transceiver 36 at the request of the mobile terminal 21.

Although the invention has been shown and described with respect to certain preferred embodiments, it is obvious that equivalents and modifications will occur to others skilled in the art upon the reading and understanding of the specification. For example, the criteria for selecting which of the transceivers 36 is utilized in the access point 19 for a given mobile terminal 21 may be based on data traffic as discussed above. The access point may cause one transceiver 36 to be assigned to a predetermined quantity of mobile terminals before permitting registration with another transceiver 36. Certain mobile terminals 21 which are known to have heavy traffic may be weighted more than other mobile terminals so as to count as two or three mobile terminals, for example. Alternatively, registration may be based on measured traffic activity at the access point 19. When usage of one channel/transceiver 36 approaches a predefined threshold, registration may be denied and directed to another transceiver 36. This way the access point 19 may balance traffic based on granting or denying registrations among the different transceivers 36.

Such selection criteria also may be based on data type. As is discussed above, voice and conventional data may be handled by respective transceivers. There are, however, other ways for distinguishing among data types. For example, an operator of a mobile terminal 21 who chooses to download one or more files from another location on the network usually expects to have to wait momentarily. Therefore, one transceiver 36 may be dedicated to handling file downloads regardless of traffic amount. Since an operator normally expects to wait, waiting an additional time due to high traffic is not readily noticeable. The other transceiver 36 is dedicated to handling data for which an operator expects an immediate response. For example, the mobile terminal 21 may be used to read a bar-code symbol. The data associated with the bar-code is then transmitted to the system backbone and instant verification is typically expected. The other transceiver 36 makes such instant verification possible.

A variety of other criterial may also be used. For example, different transceivers 36 may be selected based on the particular user. One transceiver 36 may be used by the access point 19 with respect to communications associated with operators who are ending a work shift and expecting to go home quickly. All other communications are assigned to another of the transceivers 36.

The present invention includes all such equivalents and modifications, and is limited only by the scope of the following claims.

What is claimed is:

1. An access point for use in a wireless network having a system backbone and a plurality of mobile terminals, comprising:
   a communication circuit coupling the access point to the system backbone;
   a first transceiver for wirelessly communicating with at least one of the plurality of mobile terminals on a first communication channel; and
   a second transceiver for wirelessly communicating with at least another of the plurality of mobile terminals on a second communication channel different from the first communication channel;
   wherein each transceiver periodically broadcasts a beacon, each beacon including transmission parameters corresponding to the communication channel of the first and second transceivers.

2. The access point of claim 1, wherein the first transceiver and the second transceiver are configured to communicate substantially simultaneously with their respective mobile terminals.

3. The access point of claim 1, further comprising a look-up table maintained in memory for identifying which of the first transceiver and the second transceiver is responsible for communicating with the plurality of mobile terminals registered to the access point.

4. The access point of claim 3, wherein information received via the communication circuit is forwarded to one of the plurality of mobile terminals via a corresponding one of the first transceiver and the second transceiver based on contents of the look-up table.

5. The access point of claim 1, wherein the first communication channel and the second communication channel utilize different frequency hopping sequences.

6. The access point of claim 1, wherein the first communication channel and the second communication channel utilize different PN code sequences.

7. The access point of claim 1, wherein the first communication channel and the second communication channel utilize different frequency bands.

8. The access point of claim 1, wherein the first communication channel and the second communication channel utilize different modulation techniques.

9. The access point of claim 1, further comprising means for assigning which of the plurality of mobile terminals communicate with the access point via the first transceiver and which of the plurality of mobile terminals communicate with the access point via the second transceiver.

10. The access point of claim 9, wherein the means for assigning is operative based on a predefined criteria.

11. The access point of claim 10, wherein the predefined criteria relates to a number of mobile terminals assigned to at least one of the first transceiver and the second transceiver.

12. The access point of claim 10, wherein the predefined criteria relates to an amount of data traffic handled by at least one of the first transceiver and the second transceiver.

13. The access point of claim 10, wherein the predefined criteria relates to an application type of data handled by at least one of the first transceiver and the second transceiver.

14. The access point of claim 10, wherein the predefined criteria is based on a distinction between voice data and non-voice data being communicated via the access point.

15. The access point of claim 10, wherein the first transceiver utilizes a first radio frequency technology and the second transceiver utilizes a second radio technology different from the first radio technology.

16. The access point of claim 1, wherein in the event the access point does not permit registration of one of the mobile terminals with respect to a particular one of the first transceiver and the second transceiver associated with a request to register sent by the mobile terminal, the access point automatically registers the mobile terminal with respect to the other of the first transceiver and the second transceiver.

17. The access point of claim 1, wherein in the event the access point does not permit registration of one of the mobile terminals with respect to a particular one of the first transceiver and the second transceiver associated with a request to register sent by the mobile terminal, the access point responds to the mobile terminal with a recommendation that the mobile terminal attempt to register with respect to the other of the first transceiver and the second transceiver.

18. The access point of claim 1, wherein the access point temporarily permits registration of one of the mobile terminals with respect to a particular one of the first transceiver and the second transceiver associated with the request to register, and thereafter instructs the mobile terminal to attempt to register with respect to the other of the first transceiver and the second transceiver.

19. The access point of claim 1, wherein the beacon transmitted by one of the first transceiver and the second transceiver indicates whether the access point has buffered data for a mobile terminal with respect to the other of the first transceiver and the second transceiver.

20. The access point of claim 19, wherein the buffered data is transmitted to the mobile terminal by the one of the first transceiver and the second transceiver.

21. A wireless network, comprising:
   a system backbone, a plurality of mobile terminals, and at least one access point, the access point comprising:
      a communication circuit coupling the access point to the system backbone;
      a first transceiver for wirelessly communicating with at least one of the plurality of mobile terminals on a first communication channel; and
      a second transceiver for wirelessly communicating with at least another of the plurality of mobile terminals on a second communication channel different from the first communication channel;
      wherein each transceiver periodically broadcasts a beacon, each beacon including transmission parameters corresponding to the communication channel of the first and second transceivers and the beacon transmitted by one of the first transceiver and the second transceiver indicates whether the access point has buffered data for a mobile terminal with respect to the other of the first transceiver and the second transceiver, the buffered data being transmitted to the mobile terminal by the one of the first transceiver and the second transceiver.

22. The wireless network of claim 21, wherein the first transceiver and the second transceiver are configured to communicate substantially simultaneously with their respective mobile terminals.

23. The wireless network of claim 21, further comprising a look-up table maintained in memory for identifying which of the first transceiver and the second transceiver is responsible for communicating with the plurality of mobile terminals registered to the access point.

24. The wireless network of claim 21, wherein in the event the access point does not permit registration of one of the mobile terminals with respect to a particular one of the first transceiver and the second transceiver associated with a request to register sent by the mobile terminal, the access point automatically registers the mobile terminal with respect to the other of the first transceiver and the second transceiver.

25. The wireless network of claim 21, wherein in the event the access point does not permit registration of one of the mobile terminals with respect to a particular one of the first transceiver and the second transceiver associated with a request to register sent by the mobile terminal, the access point responds to the mobile terminal with a recommendation that the mobile terminal attempt to register with respect to the other of the first transceiver and the second transceiver.

26. The wireless network of claim 21, wherein the access point temporarily permits registration of one of the mobile terminals with respect to a particular one of the first transceiver and the second transceiver associated with the request to register, and thereafter instructs the mobile terminal to attempt to register with respect to the other of the first transceiver and the second transceiver.

27. A communication method in a system comprising a system backbone, a mobile terminal, and an access point coupled to the system backbone for enabling wireless communications between the mobile terminal and the system backbone via the access point, the access point comprising a first transceiver for communicating wirelessly via a first frequency hopping sequence, and a second transceiver for communicating wirelessly via a second frequency hopping sequence different from the first frequency hopping sequence, the method comprising the steps of:
  the first transceiver and the second transceiver each periodically broadcasting a beacon, each beacon including hopping sequence data corresponding to the first frequency hopping sequence and the second frequency hopping sequence;
  the mobile terminal responding to at least one of the beacons by transmitting to the access point a request to register; and
  the access point selectively permitting registration of the mobile terminal with at least one of the first transceiver and the second transceiver in response to the request to register, based on a predetermined criteria.

28. The method of claim 27, wherein the beacons broadcasted by the first transceiver and the second transceiver contain frequency hopping sequence data corresponding exclusively to the transceiver from which the beacon is broadcasted.

29. The method of claim 27, wherein the beacons broadcasted by the first transceiver ad the second transceiver each contain frequency hopping sequence data for both the first transceiver and the second transceiver.

30. The method of claim 27, wherein in the event the access point does not permit registration of the mobile terminal with respect to a particular one of the first transceiver and the second transceiver associated with the request to register, the access point automatically registers the mobile terminal with respect to the other of the first transceiver and the second transceiver.

31. The method of claim 27, wherein in the event the access point does not permit registration of the mobile terminal with respect to a particular one of the first transceiver and the second transceiver associated with the request to register, the access point responds to the mobile terminal with a recommendation that the mobile terminal attempt to register with respect to the other of the first transceiver and the second transceiver.

32. The method of claim 27, wherein the access point temporarily permits registration of the mobile terminal with respect to a particular one of the first transceiver and the second transceiver associated with the request to register, and thereafter instructs the mobile terminal to attempt to register with respect to the other of the first transceiver and the second transceiver.

33. The method of claim 27, wherein the access point permits concurrent registration of the mobile terminal with respect to each of the first transceiver and the second transceiver.

34. The method of claim 27, wherein beacons transmitted by respective ones of the first transceiver and the second transceiver indicate whether the access point has buffered data for the mobile terminal with respect to the other of the first transceiver and the second transceiver.

35. The method of claim 27, wherein the beacons broadcast by the first transceiver and the second transceiver contain an indication of whether data has been buffered by one of the first transceiver and the second transceiver.

36. The method of claim 35, wherein the beacons broadcast by the first transceiver and the second transceiver indicate which of the first transceiver and the second transceiver has buffered data.

37. The method of claim 35, wherein the buffered data is transmitted to the mobile terminal by the other of the first transceiver and the second transceiver.

38. A communication method in a system comprising a system backbone, a mobile terminal, and an access point coupled to the system backbone for enabling wireless communications between the mobile terminal and the system backbone via the access point, the access point comprising a first transceiver for communicating wirelessly via a first frequency hopping sequence, and a second transceiver for communicating wirelessly via a second frequency hopping sequence different from the first hopping sequence, the method comprising the steps of:
  the first transceiver and the second transceiver each periodically broadcasting a beacon, each beacon including hopping sequence data corresponding to both the first frequency hopping sequence of the first transceiver and the second frequency hopping sequence of the second transceiver;
  the mobile terminal selecting which of the first transceiver and the second transceiver to register with based on the hopping sequence data and responding by transmitting to the access point a request to register; and
  the access point permitting registration of the mobile terminal with at least one of the first transceiver and the second transceiver in response to the request to register.

39. The method of claim 38, wherein the beacon further comprises information relating to usage of the first transceiver and the second transceiver.

40. The method of claim 39, wherein the information relates to types of data handled by the first transceiver and the second transceiver.

41. The method of claim 39, wherein the information relates to data traffic load of the first transceiver and the second transceiver.

42. The method of claim 38, wherein the beacons broadcast by the first transceiver and the second transceiver contain an indication of whether data has been buffered by one of the first transceiver and the second transceiver.

43. The method of claim 42, wherein the beacons broadcast by the first transceiver and the second transceiver indicate which of the first transceiver and the second transceiver has buffered data.

44. The method of claim 42, wherein the buffered data is transmitted to the mobile terminal by the other of the first transceiver and the second transceiver.

* * * * *